United States Patent
El-Raghy et al.

(10) Patent No.: US 6,461,989 B1
(45) Date of Patent: Oct. 8, 2002

(54) PROCESS FOR FORMING 312 PHASE MATERIALS AND PROCESS FOR SINTERING THE SAME

(75) Inventors: Tamer El-Raghy, Philadelphia, PA (US); Michel W. Barsoum, Pennsauken, NJ (US); Mats Sundberg, Vasteras (SE); Hans Pettersson, Erikslund (SE)

(73) Assignees: Drexel University, Philadelphia, PA (US); Sandvik AB, Sanviken (SE)

( * ) Notice: Subject to any disclaimer, the term of this patent is extended or adjusted under 35 U.S.C. 154(b) by 0 days.

(21) Appl. No.: 09/469,893

(22) Filed: Dec. 22, 1999

(51) Int. Cl.$^7$ ................. C04B 35/56; C04B 35/569
(52) U.S. Cl. ............... 501/87; 501/88; 501/91; 501/96.3; 501/97.1; 423/324
(58) Field of Search ............... 501/87, 88, 91, 501/96.3, 97.1; 423/324

(56) References Cited

U.S. PATENT DOCUMENTS

| | | | | |
|---|---|---|---|---|
| 4,961,529 A | * | 12/1988 | Gottselig et al. | 228/124 |
| 5,462,902 A | * | 10/1995 | Henager, Jr. et al. | 501/92 |
| 5,882,561 A | * | 3/1999 | Barsoum et al. | 501/88 |
| 5,942,455 A | * | 8/1999 | Barsoum et al. | 501/91 |
| 6,013,322 A | * | 1/2000 | Barsoum et al. | 427/376.1 |
| 6,165,301 A | * | 12/2000 | Henager, Jr. et al. | 156/89.11 |

FOREIGN PATENT DOCUMENTS

| | | | |
|---|---|---|---|
| DE | 37 44 250 C1 | | 8/1989 |
| DE | 19749050 | * | 12/1998 |
| DE | 197 49 050 C1 | | 10/1999 |
| FR | 2 675 141 A1 | | 10/1992 |
| JP | 63-274665 | * | 11/1988 |
| WO | 98/22244 | * | 5/1998 |

* cited by examiner

Primary Examiner—Karl Group
(74) Attorney, Agent, or Firm—Akin, Gump, Strauss, Hauer & Feld, L.L.P.

(57) ABSTRACT

A process is provided for forming a material comprising an $M_3X_1Z_2$ phase comprising the steps of: (a) providing a mixture of (i) at least one transition metal species, (ii) at least one co-metal species selected from the group consisting of aluminum species, germanium species and silicon species, and (iii) at least one non-metal species selected from the group consisting of boron species, carbon species and nitrogen species; (b) heating said mixture to a temperature of about 1000° C. to about 1800° C., in an atmosphere within a substantially enclosed heating zone, for a time sufficient to form said $M_3X_1Z_2$ phase; wherein the atmosphere has an $O_2$ partial pressure of no greater than about $1\times10^{-6}$ atm. The process provides a substantially single phase material comprising very little $MZ_x$-phase. A process for preparing a dense, substantially single-phase $M_3X_1Z_2$ phase workpiece includes providing a highly-pure $M_3X_1Z_2$-phase powder pre-form and sintering said pre-form at a temperature of about 1000° C. to about 1800° C., in an atmosphere within a substantially enclosed heating zone, for a time sufficient to form a dense, substantially single-phase, $M_3X_1Z_2$-phase workpiece; wherein the atmosphere has an $O_2$ partial pressure of no greater than about $1\times10^{-6}$ atm.

26 Claims, No Drawings

PROCESS FOR FORMING 312 PHASE MATERIALS AND PROCESS FOR SINTERING THE SAME

BACKGROUND OF THE INVENTION

Metals are generally easily machined but do not retain their machined form at high temperatures. Ceramics retain their shape at extremely high temperatures, but are brittle and very difficult to machine into a desired shape. Materials scientists have directed a great deal of effort towards finding compositions that are easily machined into a desired shape and are stable at extremely high temperatures.

One compound which is known to maintain its shape and form at high temperatures and possess machinability similar to metals is $Ti_3SiC_2$. $Ti_3SiC_2$ is a type of compound known generically as a 312 phase material. Preparation of $Ti_3SiC_2$ was reported as early as 1967, when powdered titanium hydride, silicon and graphite were combined in a self-contained graphite capsule at 2000° C. for about 20 minutes, and then quickly cooled down to 1200° C. The product was extracted to obtain a sample of $Ti_3SiC_2$, which was characterized in terms of its crystal structure. The structure was found to be hexagonal and comprised planar Si-layers linked together by TiC octahedra having a theoretical density of 4.51 $g/cm^3$.

Chemical vapor deposition (CVD) approaches to $Ti_3SiC_2$ have been reported wherein $SiCl_4$, $TiCl_4$, $CCl_4$ and $H_2$ were used as source gases at a deposition temperatures of 1573–1873° K. and total gas pressure in the CVD furnace fixed at 40 kPa. A monolithic plate of 40 mm by 12 mm by 0.4 mm was obtained at a deposition rate of 200 micrometers/hour.

Since then, other methods of synthesizing $Ti_3SiC_2$ have been described. For example, the vacuum calcination of a compacted mixture of titanium, titanium carbide and silicon powders at temperatures from 1300° C. to 1600° C. to form $Ti_3SiC_2$ has been reported. Such processes are thought to result in the vaporization, and consequent loss of silicon into the surrounding atmosphere. Attempts to adjust the initial silicon loading to anticipate silicon vaporization followed. However, such processes have not been able to prepare pure $Ti_3SiC_2$ phase. It is generally regarded that the thermal decomposition of Ti3SiC2 proceeds via the following reaction, as described in Racault, C., et al., "Solid-state Synthesis and Characterization of the Ternary Phase $Ti_3SiC_2$", J. Mat. Science, Vol. 29, pp. 3384–92 (1994):

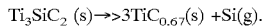

$Ti_3SiC_2$ (s)→>$3TiC_{0.67}$(s) +Si(g).

Accordingly, temperature is thought to be the only variable in the decomposition reaction of $Ti_3SiC_2$.

Researchers have also reported forming $Ti_3SiC_2$ by igniting a stoichiometric mixture of titanium, silicon and carbon black which was either cold-pressed and the resulting pellet placed in a graphite crucible and heated extremely rapidly from 800° C. to 1020–1080° C., or was placed as a loose powder in a graphite-lined boat and the boat contacted with a heating coil at 1830° C. Under either set of conditions such mixtures ignited, causing a very rapid increase in temperature with concomitant formation of $Ti_3SiC_2$. The product as formed by either method was porous and contained titanium carbide (10–20%), as opposed to a more pure $Ti_3SiC_2$ phase.

Other methods for producing purer 312 phases have involved multi-step procedures including subsequent treatments with aqueous hydrogen fluoride to remove $TiSi_2$ and leave a material consisting of 85% $Ti_3SiC_2$ and 15% TiC, followed by steps of controlled oxidation at 450° C. in air for 10 hrs, which converts TiC to $TiO_2$, and dissolution of the $TiO_2$ with a mixture of ammonium sulfate and sulfuric acid at about A method for the preparation of $Ti_3SiC_2$ from a mixture of titanium, silicon and carbon powders has been reported. A powder mixture was compacted to pellets, optionally arc-melted in an argon atmosphere, and then heated in evacuated quartz tubes at either 900° C. for 24 hr. (no $Ti_3SiC_2$ formed), 1400° C. for 5 hr. ($Ti_3SiC_2$ with other phases formed but quartz tubes exploded) or 1200° C. for 100 hr ($Ti_3SiC_2$ formed in addition to other phases). The arc melting process caused some loss of silicon and carbon, but yielded samples having superior homogeneity. Treatment of the product with hydrofluoric acid, to leach out titanium suicides, was necessary to prepare final powders with over 99% phase-pure $Ti_3SiC_2$.

Thus, there is a great deal of interest among materials scientists in preparing essentially pure 312 phase materials comprising $Ti_3SiC_2$. However, as discussed above, most efforts to maximize the percentage of 312 phase produced by such prior art methods have centered around the assumption that silicon evaporates as Si(g). Unfortunately, most prior art methods for preparing 312 phase materials have been unable to produce substantially pure 312 phase materials in an economic, one-step process not involving subsequent treatments which are time-consuming, expensive and inefficient.

U.S. Pat. No. 5,942,455 of Barsoum, et al. describes a one-step synthesis of 312 phases and composites thereof. Barsoum, et al. teach a process for the formation of 312 phases wherein relatively pure samples are prepared by heating powder mixtures under "non-oxidizing" atmospheres which are exemplified by and otherwise understood to be inert gases, optionally under applied pressure. However, the use of inert gas atmospheres at atmospheric pressure alone does not produce highly pure samples of 312 phases. Furthermore, the application of such external pressures can be expensive and may render production uneconomical.

Thus, there is a need in the art for a process by which highly pure 312 phase materials such as $Ti_3SiC_2$ can be produced in a simple, one-step, economical manner.

BRIEF SUMMARY OF THE INVENTION

The present inventors have found that the high temperature thermal decomposition of $Ti_3SiC_2$ proceeds by a different chemical reaction than that which was previously believed. As discussed below, the present inventors have found that the high temperature thermal decomposition of $Ti_3SiC_2$ proceeds according to the following reaction:

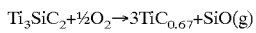

$Ti_3SiC_2 + ½O_2 → 3TiC_{0.67} + SiO(g)$ and thus, have realized the importance of oxygen concentration in the formation of unwanted by-products such as $TiC_{0.67}$. Additionally, during the initial formation of 312 phase materials, such as $Ti_3SiC_2$, oxygen may become involved in unwanted interactions with precursors and intermediates, resulting in a reduction in the purity of the 312 phase materials produced.

Thus, the present invention is directed to a process for forming highly pure 312 phase materials in a simple, one-step manner, by controlling oxygen partial pressure during formation of 312 phase materials.

The present invention includes a process for forming a material comprising an $M_3X_1Z2$ phase wherein M is at least one transition metal, X is at least one of Al, Ge and Si, and Z is at least one of B, C and N, said process comprising the steps of: (a) providing a mixture of (i) at least one transition metal species, (ii) at least one co-metal species selected from the group consisting of aluminum species, germanium species and silicon species and (iii) at least one non-metal species selected from the group consisting of boron species, carbon species and nitrogen species; and (b) heating said mixture to a temperature of about 1000° C. to about 1800° C., in an atmosphere within a substantially enclosed heating zone, for a time sufficient to form said $M_3X_1Z_2$ phase; wherein the atmosphere has an $O_2$ partial pressure of no greater than about $1\times10^{-6}$ atm.

According to the present invention the process for forming a material comprising an $M_3X_1Z2$ phase can be performed by heating said mixture in step (b) at substantially atmospheric pressure, or under an applied vacuum wherein the atmosphere preferably has an $O_2$ partial pressure of no greater than about $1\times10^{-8}$ atm, and preferably at a rate of no greater than about 25° C./min.

The present invention also includes a process for a forming dense, substantially single-phase $M_3X_1Z_2$ phase workpiece, said process comprising the steps of: (a) providing a highly-pure $M3X_1Z_2$ phase powder pre-form; (b) sintering said pre-form at a temperature of about 1000° C. to about 1800° C., in an atmosphere within a substantially enclosed heating zone, for a time sufficient to form said dense, substantially single-phase, $M_3X_1Z_2$ phase workpiece; wherein the atmosphere has an $O^2$ partial pressure of no greater than about $1\times10^{-6}$ atm. Preferably, the highly-pure $M_3X_1Z_2$ phase powder pre-form comprises an $M_3X_1Z_2$ phase powder prepared in accordance with the invention. Additionally, the highly-pure $M_3X_1Z_2$ phase powder pre-form is preferably prepared by cold-pressing a powder, or by combination of a powder with a binder followed by extrusion, prior to the sintering step.

DETAILED DESCRIPTION OF THE INVENTION

According to the present invention, a mixture is heated to a high temperature in an atmosphere having a minimal $O_2$ partial pressure for a time sufficient to allow the mixture components to react with one another to form a substantially pure 312 phase material. As used herein, the term "312 phase" encompasses ternary compounds and solid solutions, both of the formula $M_3X_1Z_2$, where M is one or more transition metals, X is one or more co-metals (which are not transition metals) such as Al, Ge and Si, and Z is one or more non-metals such as B, C and N. The designation "312" is taken from the molar ratio of M:X:Z in the phase. For convenience, the elements denoted by "M" will be referred to as transition metals, the elements denoted by "X" will be referred to as co-metals (although they could also be referred to as semi-metals or, more simply as "metals"), and the elements denoted as "Z" will be referred to as non-metals.

In general, a ternary compound consists essentially of three elements in a regular repeating array. The ternary compounds prepared by the inventive process are formed from a single transition metal (M), a single co-metal (X) and a single non-metal (Z). The stoichiometry of the ternary compounds prepared by the invention is such that the M:X:Z atomic ratio is substantially centered around 3:1:2. Preferred 312 phases prepared by the invention include $Ti_3SiC_2$, $Ti_3AlC_2$ and $Ti_3GeC_2$.

In contrast to ternary compounds, the solid solutions prepared by the inventive processes are formed from at least four and possibly many more elements, where each of the elements is either a transition metal, a co-metal or a non-metal as defined above. Thus, M in a solid solution may be one or more transition metals, while X may be one or more of silicon (Si), aluminum (Al), or germanium (Ge), and Z may be one or more of boron (B), carbon (C) and nitrogen (N). However, the molar ratio of the total of the transition metals (M) to the total of the co-metals (X) to the total of the non-metals (Z), i.e., M:X:Z, in a solid solution prepared by an inventive process is substantially centered around 3:1:2.

Thus, the solid solutions prepared by the invention are essentially 312 phases wherein some of the transition metal is replaced with one or more different transition metals, and/or some of the co-metal is replaced with one or more different co-metals, and/or some of the non-metal is replaced with one or more different non-metals. Preferred solid solutions include $(Ti,Zr)_3SiC_2$, $(Ti,Hf)_3SiC_2$, $(Ti,Hf)_3(Si,Ge)C_2$, $(Ti,Zr)_3(Si,Ge)(C,N)_2$, $(Ti,V)_3SiC_2$, $(Ti,V)_3Si(C,N)_2$, $Ti_3(Si,Al)C_2$, $(Ti,V)_3(Si,Ge)(C,N)_2$, $(Ti,V,Hf)_3(Si,Ge)(C,N)_2$, $(Ti,V,Hf)_3(Si,Ge,Al)(C,N)_2$.

The 312 ternary compounds prepared by the processes of the invention and the solid solutions prepared by the processes of the invention will be referred to collectively herein as 312 phases. The 312 phases prepared by the processes of the invention are preferably single phase and polycrystalline. In this instance, the term "polycrystalline" means that when viewed under a microscope, distinct grains can be seen wherein each distinct grain is formed of a single crystal of the ternary compound or solid solution. The grains can be distinguished from one another by their having unique crystal structure directionality. The term "single phase" is well known in the art, and simply means that predominantly one phase is present in the final microstructure.

The synthesis of 312 phases according to a preferred inventive process requires the preparation of a mixture of powders that has the same atomic constitution as the desired 312 phase. According to this inventive process, all or essentially all of the atoms present in the mixture of powders will also be present in the product 312 phase or composite thereof, and essentially all of the atoms present in the product 312 phase or composite will also have been present in the mixture of powders. Thus, it is preferable to prepare the mixture of powders such that it has the same atomic ratio as is desirably present in the product 312 phase.

The mixture of powders employed in the inventive processes comprise (i) transition metal species, (ii) co-metal species such as silicon species, aluminum species and/or germanium species, and (iii) non-metal species such as boron species, carbon species and/or nitrogen species. The term "species" simply refers to a chemical that contains the indicated element, where chemicals include molecules, salts, compounds, complexes, polymers, etc.

A transition metal species is a chemical that includes at least one transition metal. Exemplary transition metals are those of Group 3 (Sc, Y, La and Ac), Group 4 (Ti, Zr and Hf), Group 5 (V, Nb, Ta) and Group 6 (Cr, Mo and W) of the Periodic Table of the Elements (current IUPAC designations). Other exemplary transition metals are first row transition metals, i.e., Mn, Fe, Co, Ni and Zn.

The transition metal species may be the transition metal per se, e.g., titanium metal of greater than 99% purity, or it may be a transition metal compound, complex, molecule, salt, etc., such as a transition metal hydride (e.g., titanium hydride), transition metal boride (e.g., titanium boride), transition metal carbide (e.g., titanium carbide), transition metal silicide (e.g., titanium silicide), or a transition metal nitride (e.g., titanium nitride).

Any transition metal species can be employed in preparing the mixture of powders according to the invention. However, since substantially all of the atoms present in the starting mixture of powders are also present in the final product composition, the transition metal species preferably contains only the elements that are desirably present in the final product composition. Transition metal hydrides are an exception to this general rule, and in fact transition metal per se and transition metal hydride are preferred transition metal species according to the invention.

Some transition metals are difficult to prepare in powdered form, and it is known in the art to react transition metal per se with hydrogen, to form transition metal hydride that is substantially more brittle than transition metal per se. The transition metal hydride is then powdered and may be used in the inventive process, or it may be converted back to transition metal per se by dehydriding before being used in the inventive process.

Titanium is a preferred transition metal for a transition metal species. In preparing products by the inventive process, titanium metal per se, including dehydrided titanium, as well as titanium hydride are preferred transition metal species. Thus, M is preferably Ti in the 312 phases and composites thereof prepared according to the invention. When 312 phase solid solutions are prepared according to the invention, M is preferably predominantly titanium, more preferably M is at least about 80% of the transition metal component of the 312 phase solid solution, and even more preferably is at least about 95% of the transition metal component of the 312 phase solid solution.

A co-metal species of the invention is any chemical, e.g., a compound, complex, molecule or salt, that contains a silicon, aluminum or germanium atom. Likewise, a silicon, aluminum and/or germanium species is any chemical that contains at least one silicon, aluminum or germanium atom, respectively. Thus, a co-metal species may be a co-metal per se (e.g., silicon metal), co-metal carbide (e.g., silicon carbide), co-metal nitride (e.g., silicon nitride) or a bimetallic transition metal/co-metal species (e.g., titanium silicide).

Preferred aluminum species are aluminum metal (aluminum metal per se), aluminum nitride and aluminum carbide.

Preferred germanium species are germanium metal (germanium metal per se) and germanium nitride.

Preferred silicon species are silicon metal, including silicon powder, silicon carbide, silicon nitride and transition metal silicides such as titanium silicide. Silicon powder and silicon carbide are preferred silicon species, where silicon carbide can also serve as a non-metal (carbon) species in the mixture, as discussed below.

A third component of the mixture of the invention is a non-metal species, which is any complex, compound, molecule, salt, etc., that contains at least one non-metal atom such as carbon, boron and nitrogen. Preferred non-metal species contain boron (denoted herein as boron species), carbon (denoted herein as carbon species) and/or nitrogen (denoted herein as nitrogen species).

Carbon species are a preferred non-metal species, where preferred carbon species contain substantially exclusively carbon atoms, such as graphite, carbon black, charcoal and coke. However, carbon species containing atoms in addition to carbon, such as transition metal carbides (e.g., titanium carbide) and non-transition metal (i.e., co-metal) carbides (e.g., silicon carbide) may also be employed as the carbon species.

Boron species that are suitable non-metal species for the invention include boron, silicon boron, and transition metal boride.

Nitrogen species that are suitable non-metal species for the invention include silicon nitride and transition metal nitride (e.g., titanium nitride).

As seen from the above illustrations, a specific transition metal, co-metal or non-metal species may be elemental, i.e., formed of only the transition metal, co-metal or non-metal, respectively. In addition, a specific transition metal, co-metal or non-metal species may be binary, i.e., formed from two elements, e.g., SiC, although not necessarily in equimolar amounts, e.g., as in $Al_4C_3$. Although not typically the case, the specific transition metal, co-metal or non-metal species may be ternary, quaternary, or even a higher order form.

The inventive process for forming a material comprising an $M_3X_1Z_2$ phase is distinct from hot pressing merely to density a mixture of powders, in that a reaction occurs between the components of the mixture so as to form 312 phases. Thus, the mixture of powders preferably does not contain any of the 312 phase which is to be formed by the inventive process. However, the presence of 312 phase in the mixture of powders is not detrimental to the inventive process, and so the mixture of powders may contain 312 phases. However, the initial mixture of powders preferably contains no more than about 80 weight percent of the 312 phase being formed by the process, and more preferably contains no more than about 50 weight percent of the 312 phase being formed by the process.

The mixture of powders used as the starting material in the inventive process is formed from transition metal species, co-metal species and non-metal species. Thus, each of the transition metal species, co-metal species and non-metal species is preferably in powdered form prior to being mixed together to form the mixture of powders. A certain powder in the mixture of powders can serve in more than one capacity, i.e., it can function as more than one of a transition metal species, co-metal species or non-metal species. For example, silicon carbide may be present in the mixture of powders, and serve as both a co-metal species and non-metal species.

The individual powders used to prepare the mixture of powders typically have average particle diameters ($d_m$) of about 0.1 to about 200 microns. Preferably, the transition metal species has an average particle size of about 1 to about 100 $\mu$m, the co-metal species has an average particle size of about 0.1 to about 80 $\mu$m, and the non-metal species has an average particle size of about 0.1 to about 100 $\mu$m.

Another way to characterize the size of the powders is to specify the mesh size through which they will pass. By this convention, the powders used in the invention preferably have a mesh size of less than about 100, and more preferably have a mesh size of less than about 325. The designation −325 mesh indicates that the powder will pass through a 325 mesh screen.

To prepare substantially pure 312 phases by the inventive process, a mixture of powders containing transition metal species, co-metal species and non-metal species is prepared such that the molar ratio of M:X:Z in the mixture of powders is substantially centered around 3:1:2. The exact amount by which the M:X:Z molar ratio may vary from 3:1:2 and yet still form substantially pure 312 phase depends on the identity of the 312 phase being prepared. Thus, reference to a phase diagram including the 312 phase of interest will reveal the stoichiometric boundaries of the 312 phase, and thus the stoichiometric boundaries within which the mixture of powders must stay if exclusively 312 phase is to be formed. As a rough estimate, the molar ratio of M:X:Z should be within about 20% of the 3:1:2 ratio, i.e., about 3.6–2.4:1.2–0.8:1.4–0.6 for 312 phase to form exclusively. As used herein, the phrase "substantially pure 312 phase" refers to a material which is predominantly a single phase 312 sample. Predominantly single phase 312 materials are those samples which have a 312 phase content of approximately 95 vol. % or more. Preferably, the 312 phase content of a predominantly single phase 312 material is 96 vol. % or more. More preferably, the 312 phase content of a predominantly single phase 312 material is 97 vol. % or more. Even more preferably, the 312 phase content is 98 vol. % or more. Most preferably, the 312 phase content is 99 vol. % or more, and ideally, it is 99.9 vol. % or more.

To prepare the mixture of powders, all of the individual powders of transition metal species, co-metal species and non-metal species are combined and then mixed thoroughly to provide a homogeneous mixture. Machines that can mix powders to homogeneity are well known in the art, and are suitably employed in the present invention. Two such machines are a ball-mill and a V-blender. While the mixing machine is not critical, a ball-mill is preferred for providing a higher degree of homogeniety. A mixing time of about 2 hours in a ball-mill will typically provide a homogeneous mixture of powders suitable for use in the inventive process.

As an optional step, the mixture of powders can be compacted to form what is known in the art as a "compact" or a "green body". Methods for forming compacts and green bodies from powders are well known in the art, and any such method may be employed in the inventive process. Green bodies for use in the inventive process may be formed by cold-pressing, i.e., no heat is applied while the mixture of powders is placed under pressure. A binder may optionally be present in the mixture of powders when forming a green body, where the binder provides some cohesiveness to the powders that make up the green body. Appropriate binders are well known in the art, and include for example, methylcellulose (MC), hydroxyethylcellulose (HEC), polyethyleneoxide (PEO), polyvinylalcohol (PVA), starch, etc. The amount of binder added is not critical, but is preferably about 1–10% by weight based on the dry powder.

When forming a 312 phase powder in accordance with the present invention it is preferred to begin with uncompacted powders. For convenience, the following description will refer to the use of uncompacted powders, however (compacted) green-bodies formed from the powders can similarly be used in the following process.

According to the present invention the process for forming a material comprising a 312 phase includes heating the mixture of powders to a temperature of about 1000° C. to about 1800° C., more preferably to a temperature of about 1100° C. to about 1650° C., and most preferably to a temperature of about 1300° C. to about 1550° C. The mixture is preferably heated in a controlled manner to avoid rapid heating. It is important that the mixture is not heated at too great a rate as such rapid heating can cause ignition of the mixture. Generally the mixture should be heated at a maximum rate of about 25° C./minute. While heating rates as low as 1° C./minute or less are acceptable, economic factors and time constraints suggest faster heating rates. Thus, according to the present invention it is preferable to heat the mixture at a rate of from about 2° C./minute to about 15° C./minute, and most preferably from about 3° C./minute to about 10° C./minute. The most important heating criterion is the maximum rate at which the mixture is heated. Minimal heating rates are acceptable, so long as the heating rate does not significantly exceed about 25° C./minute.

The mixture is heated in a substantially enclosed heating zone. As used herein, "substantially enclosed" refers to an area for heating which is not purposefully left open to the ambient atmosphere. For example, heating chambers are generally not completely hermetically sealed and often contain small, inconsequential leaks. According to the present invention, it is preferable to use a heating zone which is sealed from the ambient atmosphere, but total hermetic sealing is not absolutely required. Heating zones for use in accordance with the present invention generally contain at least one gas inlet and at least one gas outlet to allow for continuous gas flow.

Heating zones for use in accordance with the present invention can be of any type, such as, for example, a tube furnace, a continuous furnace or a box furnace. Furthermore, while it is advantageous to practice the present invention at substantially atmospheric pressure for economic reasons, a vacuum furnace may also be used. The use of a vacuum furnace in the process of the present invention can have a beneficial effect of reducing the amount of gas in contact with the reactants, and thus, reducing the amount of oxygen which needs to be removed to obtain the desired $O_2$ partial pressure. However, in practice, vacuum furnaces are often not perfectly, hermetically sealed. In the case of a vacuum furnace with leaks, the removal of gases by the application of a vacuum may not be sufficient to reduce the partial pressure of oxygen to a level in accordance with the process of the present invention, and thus, additional oxygen-reducing measures may be required to achieve an atmosphere within the heating zone which has an $O_2$ partial pressure of no greater than about $1 \times 10^{-8}$ atm.

A tube furnace which can be used in the present invention can be of any length to accommodate the mixture and can have gas inlet(s) and outlet(s) at various locations, for example, at opposite ends of the furnace. The particular size and shape of the heating zone and location of gas inlet(s) and outlets are not critical. However, the heating zone must be able to withstand high temperatures in accordance with the process of the present invention. Such materials include, but are not limited to, alumina, graphite, refractory brick-lined furnaces, water-cooled metal furnaces and others. The type of furnace material is not critical except with respect to heat. Furnace materials should preferably be able to withstand temperatures of about 1800° C. for approximately 4 hours or more.

The gas inlet(s) and outlet(s) can be of any shape and size. The particular type of inlet/outlet is not critical. It is preferable that at least an inlet be capable of accepting a gas supply line via conventional means such as pressure fitting, threads, clamps, or adhesive sealant, etc. Furthermore, the gas inlet(s) and outlet(s) should be as small as possible to avoid excess exposure to the ambient atmosphere.

In a preferred embodiment of the present invention, the process for forming a material comprising a 312 phase preferably includes heating the mixture at substantially atmospheric pressure. As used herein, "substantially atmospheric pressure" refers to any pressure at or near standard atmospheric pressure at sea level (STP). It should be understood that deviations from 1 atm are included in the definition of substantially atmospheric pressure, and that only externally applied increases in pressure and externally applied vacuums are excluded by this term. Substantially atmospheric pressure can be achieved by supplying a gas via an inlet into the heating zone and out of the heating zone via an outlet during the reaction of the mixture components, and thus, pressure inside the heating zone may fluctuate but should remain at substantially atmospheric pressure as defined herein.

The gas supplied to the heating zone can be any one or more gases including but not limited to hydrogen, helium and noble gases (inert), which do not react with the mixture components. Gases which may be used in accordance with the present invention include, for example, argon, helium, and buffered gas mixtures. Gases which are reactive with the mixture components should be avoided. For instance, while nitrogen is generally considered a nonreactive gas, it may react with titanium at high temperatures to produce titanium nitride (TiN), which is not desired.

Gases which can be used in the present invention (e.g., argon, etc.) can be obtained commercially. Commercially-obtained "pure" gases often contain oxygen impurities of 50 to 100 ppm or more, which corresponds to an $O_2$ partial pressure of $5 \times 10^{-5}$ atm to $10^{-4}$ atm or more. An essential feature of the present invention is that the atmosphere within the heating zone has an $O_2$ partial pressure of about $10^{-6}$ atm or less. Applicants have found that by limiting the amount of oxygen present in the gas to a partial pressure of about $10^{-6}$ atm or less, preferably about $10^{-8}$ atm or less, more preferably about $10^{-12}$ atm or less, even more preferably about $10^{-20}$ atm or less, and most preferably about $10^{-25}$ atm or less, a predominantly single phase 312-phase material can be obtained.

The $O_2$ partial pressure of the gas supplied to the heating zone can be reduced to the lowered level at any time prior to contact with the mixture. Thus, the $O_2$ partial pressure of the gas can be reduced before passage through the gas inlet of the heating zone, or after entry into the heating chamber, but prior to contact with the mixture. Additionally, a gas produced via methods which obtain increased purity with respect to oxygen levels can be used directly, so long as the $O_2$ partial pressure of the gas is about $10^{-6}$ atm or less.

When supplied gases having higher oxygen impurity levels are used for the present invention, the level of oxygen must be reduced. Oxygen impurities present in the gases to be used can be removed in any manner effective to lower the $O_2$ partial pressure to the required level.

One preferred embodiment of the present invention includes the use of an oxygen getter to reduce the $O_2$ partial pressure of the atmosphere within the heating zone. Oxygen getters include any substance which will react with oxygen in a non-combustible manner (e.g., a metal) and bind the oxygen with the material, thus removing the oxygen from the gas surrounding the getter. Preferably, in order to effectively remove oxygen, a getter should be heated. Normally temperatures of at least about 400° C. are maintained for a getter to properly remove oxygen impurities. Preferably, the temperature of an effective getter in accordance with the present invention can be from about 400° C. to about 1000° C., more preferably about 600° C. to about 1000° C., and most preferably from about 800° C. to about 1000° C. The particular type of metal which is used as a getter is not critical, so long as the metal has a high affinity for oxygen and does not form a protective oxide layer upon oxidation (e.g., aluminum). Preferred getter metals include titanium, zirconium and hafnium. Titanium powder is most preferred. Preferably, the metal comprising the getter should have as large a surface area as possible to provide a large contact area for gettering, such as, for example a loose powder bed. However, solid metal blocks, coils, and other forms can be used, so long as they are adequately heated to an effective temperature.

The temperature of a metal powder getter is preferably kept below a temperature at which the metal may melt or sinter. Melting or sintering will have an adverse effect on the gettering capacity of the metal powder. Thus, the getter is preferably maintained at an elevated temperature which is below that used in the heating step of the reaction of the invention.

An oxygen getter can be placed inside the heating zone, outside the heating zone (e.g., in a separate in-line furnace), or in both locations. Thus, more than one oxygen getter can be used in a process in accordance with the present invention. For example, an oxygen getter could be located in the heating zone near the gas inlet(s) and an oxygen getter could also be placed along the stream of the gas supplied to the gas inlet(s). An oxygen getter could also be placed at or near the outlet of the heating zone to prevent $O_2$ contamination from the outlet area. Preferably, a getter is placed immediately preceding the powder mixture so as to reduce the $O_2$ partial pressure just before contact of the gas with the mixture.

The amount of metal powder used as a getter can vary greatly. The getter is disposable and may eventually need to be replaced after its oxygen-absorbing capacity has been exhausted. Thus, the more material used in a getter, the less often it must be replaced.

Another preferred embodiment of the present invention includes the use of a buffered gas mixture to reduce the $O_2$ partial pressure of the atmosphere within the heating zone. A buffered gas mixture is a combination of gases, a first gas of which is reactive with oxygen, and a second gas of which is the product of the first gas and oxygen. A mixture of such a first gas and a second gas is introduced into the heating zone in such a proportion so as to favor reaction of the first gas and any oxygen present to form the second gas, thus removing free oxygen from the atmosphere within the heating zone. Some examples of gases which can be used in buffered gas mixtures in accordance with the present invention include, but are not limited to, Ar, $H_2$, $H_2O$, CO, $CO_2$ and $CH_4$, wherein the preferred mixtures comprise $H_2/H_2O$ and $CO/CO_2$. Thus, for example, hydrogen and water (steam) introduced into the heating zone in a proportion that favors production of water will effect the reaction of hydrogen with any oxygen present to form water according to the following equation:

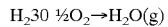
$$H_2 + \tfrac{1}{2}O_2 \rightarrow H_2O(g)$$

The proportion or ratio of the gases in a buffered gas mixture to be introduced into a heating zone in accordance with the present invention may vary depending upon the desired partial pressure of oxygen in the heating zone. Such a proportion or ratio can be determined in accordance with known principles relating to the partial pressures of reactants in a gas phase equilibria, wherein the equilibrium quotient for a given reaction is logarithmically related to the free energy value associated with the reaction at a particular temperature. For example, the equilibrium quotient for the generic reaction:

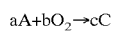
$$aA + bO_2 \rightarrow cC$$

is expressed as $$[C]^c/[A]^a[O_2]^b$$

wherein the concentration values of the product and reactants are in terms of partial pressures. Thus, based on the free energy value associated with a reaction and the ratio of product(s) to reactant(s), a desired oxygen partial pressure can be maintained.

Buffered gas mixtures can be introduced directly into the heating zone or into a gas supply line. Additionally, buffered gas mixtures can be used in combination with oxygen getters to remove free oxygen in the heating zone.

In another embodiment of the present invention, the process for forming a material comprising a 312 phase preferably includes heating the mixture under an ixapplied vacuum. As used herein, "an applied vacuum" can refer to a partial evacuation of the heating zone or complete evacuation of the heating zone. If complete evacuation of a perfectly hermetically sealed heating zone is attainable, no further oxygen reduction is necessary, as no $O_2$ is present in a complete vacuum. Thus, an alternative method of heating a mixture in accordance with the present invention wherein the atmosphere within the heating zone has an $O_2$ partial pressure of about $1 \times 10^{-8}$ atm or less, is via the evacuation of the gases in the heating zone to such an extent that the requisite $O_2$ partial pressure is achieved.

In determining the $O_2$ partial pressure of the atmosphere within the heating zone at any time before, during, or after the reaction of the mixture components, as well as the $O_2$ partial pressure at, or near, the gas inlet(s)/outlet(s), an oxygen sensor may be used. The particular type of oxygen sensor used is not critical. One example of an oxygen sensor for use in measuring $O_2$ partial pressure is a zirconia-based solid state sensor wherein oxygen partial pressure is measured as a voltage and the voltage is related to the oxygen partial pressure by a derivation of the Nernst equation. Such sensors are available commercially, for example through Ceramatec in Salt Lake City, Utah. Measurement can be performed by placing the sensor portion of the device in contact with the atmosphere to be measured.

A process for forming a dense, substantially single-phase, $M_3X_1Z_2$-phase workpiece in accordance with the present invention includes providing a highly-pure $M_3X_1Z_2$-phase powder pre-form and sintering said pre-form at a temperature of about 1000° C. to about 1800° C., in an atmosphere within a substantially enclosed heating zone, for a time sufficient to form a dense, substantially single-phase, M3$X_1$Z2-phase workpiece; wherein the atmosphere has an $O_2$ partial pressure of no greater than about $1 \times 10^{-6}$ atm.

Powder pre-forms for use in the process for forming dense, substantially single-phase, $M_3X_1Z_2$-phase workpieces are preferably comprise an M3$X_1Z_2$-phase powder prepared in accordance with the present invention. However, other 312-phase powders can be sintered in accordance with the present invention.

The powder pre-form is also preferably cold-pressed into a compact or "green-body", or combined with a binder and extruded into objects, prior to sintering. Methods of cold-pressing and binders which may be used are similar to those discussed above, and are well-known in the art.

Sintering is accomplished via placement of the powder pre-form in a heating zone, as discussed above, and the atmosphere therein has an $O_2$ partial pressure no greater than about $1 \times 10^{-6}$ atm. The $O_2$ partial pressure is attained via the use of getters and/or buffered gas mixtures, as described above. Furthermore, this aspect of Applicants invention may be practiced at substantially atmospheric pressure, or under an applied vacuum wherein the atmosphere within the heating zone preferably has an $O_2$ partial pressure of about $10^{-8}$ atm or less. Applicants have found that by limiting the amount of oxygen present in the atmosphere during sintering to a partial pressure of about $10^{-6}$ atm or less, more preferably about $10^{-12}$ atm or less, even more preferably about $10^{-20}$ atm or less, and most preferably about $10^{-25}$ atm or less, dense, substantially single-phase, $M_3X_1Z_2$-phase workpieces can be obtained.

Sintering in accordance with the present invention is preferably performed at temperatures of from about 1000° C. to about 1800° C., more preferably to a temperature of about 1100° C. to about 1650° C., and most preferably to a temperature of about 1300° C. to about 1550° C. Furthermore, heating rates, as discussed above, are preferably employed to avoid rapid heating The present invention will now be illustrated in more detail by reference to the following specific, non-limiting examples.

EXAMPLE 1

Ti, SiC and graphite powders were mixed to yield the $Ti_3SiC_2$ stoichiometry. The mixture was placed in a tube furnace under a 2.5 l/min argon flow. The powder bed was ≈1" wide, 0.5" thick and 3 ft. long. The furnace was heated at a rate of 8° C./min to 1600° C. and held (soaked) there for 4 hrs. After the 4 hrs. soaking, the furnace was turned off. The powder bed was taken out of the furnace. It was noticed that the bed looked dark-gray and/or black close to the gas inlet and gray at the gas outlet. It was also noticed that the dark-gray and/or black color was due to a ≈3 mm thick surface layer present on the partially sintered bed of powder. This layer became thinner toward the gas outlet side. At the gas outlet it was no longer visible. Samples from different locations of the bed were evaluated by x-ray diffraction. It was found that a sample from close to the gas inlet (more black in color) had ≈30–40 vol. % TiC, while a sample from close to the gas outlet (light-gray in color) had <3 vol. % TiC. In other words, the dark-gray and/or black layer was $TiC_x$ rich.

In this example, the $Ti_3SiC_2$ powder bed near the inlet side of the tube furnace acted as an oxygen getter for the powders downstream. In other words, as the argon flowed down the tube, its oxygen content was reduced leading to purer powders.

Additionally, a brownish "foam" with bright "whiskers" had accumulated at the gas outlet. The foam was analyzed using x-ray diffraction techniques, indicating the presence of crystalline silicon. Chemical analysis of the foam indicated the presence of 16.4% by weight of oxygen. Similar analysis showed the whiskers to contain 22.5% by weight of oxygen. The powders at the inlet side of the tube reactor contained only 0.13% by weight of oxygen. While not wishing to be bound by theory, it is believed that gaseous SiO formed during the oxidation of the $Ti_3SiC_2$ getter dissociates as it cools near the gas outlet according to the following reaction:

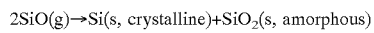

$$2SiO(g) \rightarrow Si(s, crystalline) + SiO_2(s, amorphous)$$

The production of crystalline silicon and amorphous silicon dioxide according to the above reaction involving the decomposition of SiO(g), is consistent with the high temperature thermal decomposition of $Ti_3SiC_2$ described above wherein SiO(g) is produced.

EXAMPLE 2

Ti, SiC and graphite powders were mixed to yield the $Ti_3SiC_2$ stoichiometry. The mixture was placed in a tube furnace under a 2.5 l/min Argon flow. The powder bed was ≈1" wide, 0.5" thick and 3 ft. long. A pure Ti powder bed of ≈1" wide, 0.5" thick and 5" long was placed before the mixture powder bed, so that the argon gas passed through the Ti bed first, in order to reduce the oxygen in the flowing gas by reacting it with the Ti bed. In other words, the Ti bed acted as an oxygen getter. In this example the Ti bed was placed in proximity of the $Ti_3SiC_2$ bed, i.e., in the heating zone. The furnace was heated at a rate of 8° C./min to 1600° C. and held (soaked) there for 4 hrs. After the 4 hrs. soaking, the furnace was turned off. The powder bed was taken out of the furnace. Compared to Example 1, it was noticed that the Ti$_3$SiC$_2$ powder bed was less black at the end closest to the gas inlet, and light-gray at the gas outlet. The gray color is that of pure Ti$_3$SiC$_2$, while the dark color indicates TiCx. It was noticed the thickness of the black layer at ≈1 mm was significantly less than in Example 1 and covered only ≈10" of the length of the powder bed. The Ti bed sintered into a near solid mass, with a yellow surface layer. An x-ray diffraction of the yellow surface layer indicated it to be TiO2. Samples from different locations of the bed were evaluated by x-ray diffraction. It was found that a sample from close to the gas inlet (more black in color) had ≈5 vol. % TiC, while a sample from close to the gas outlet (more gray in color) had <3 vol. % TiC. It was found that the black layer was TiC$_x$ rich.

EXAMPLE 3

Ti, SiC and graphite powders were mixed to yield the Ti$_3$SiC$_2$ stoichiometry. The mixture was placed in a tube furnace under a 2.5 l/min argon flow. The powder bed was ≈1" wide, 0.5" thick and 3 ft. long. In this example, the Ti powder bed of ≈1" wide, 0.5" thick and 5" long was not placed in the heating zone, but in a colder zone in the furnace. This was done to prevent the sintering of the Ti bed, and hence maintain the high surface area provided by a porous mass of Ti. The furnace was heated at a rate of 8° C./min to 1600 ° C. and held (soaked) there for 4 hrs. After the 4 hrs. soaking, the furnace was turned off. The powder bed was taken out of the furnace. Compared to Examples 1 and 2, it was noticed that the Ti$_3$SiC$_2$ bed looked quite uniform except for a very thin (≈1 mm) black layer close to the gas inlet. The Ti bed was porous with a yellow shade due to the formation of TiO$_2$. Samples from different locations from the bed were evaluated by x-ray diffraction. It was found that both a sample from close to the gas inlet and a sample from close to the gas outlet had <3 vol. % TiCx. From these runs, it was concluded that reducing the oxygen partial pressure (content) in the flowing gas using a Ti getter for O$_2$ reduces the amount of TiC$_x$ in the Ti$_3$SiC$_2$ powder bed and hence enhances the quality of the final product.

EXAMPLE 4

Ti, Si and graphite powders were mixed to yield the Ti$_3$SiC$_2$ stoichiometry. The mixture was placed in a tube furnace under a 2.5/min argon flow. The powder bed was ≈1" wide, 0.5" thick and 3 ft. long. In this example, the Ti powder bed of ≈1" wide, 0.5" thick and 5" long was not placed in the heating zone, but in a colder zone in the furnace. This was done to prevent the sintering of the Ti bed, and hence maintain the high surface area provided by a porous mass of Ti. The furnace was heated at a rate of 8° C./min to 1600° C. and held (soaked) there for 4 hrs. After the 4 hrs. soaking, the furnace was turned off. The powder bed was taken out of the furnace. Compared to Examples 1 and 2, it was noticed that the Ti$_3$SiC$_2$ bed looked quite uniform except for a very thin (≈1 mm) black layer close to the gas inlet. The Ti bed was porous with a yellow shade due to the formation of TiO$_2$. Samples from different locations from the bed were evaluated by x-ray diffraction. It was found that both a sample from close to the gas inlet and a sample from close to the gas outlet had ≦3 vol. % TiC$_x$. From these runs, it was concluded that reducing the oxygen partial pressure (content) in the flowing gas using a Ti getter for O$_2$ reduces the amount of TiC$_x$ in the Ti$_3$SiC$_2$ powder bed and hence enhances the quality of the final product.

Using an oxygen sensor obtained from Cerametec, in Salt Lake City, Utah, the oxygen partial pressure was measured at the gas inlet and gas outlet at several different points throughout the reaction. The standard operating temperature of the sensor was 1023° K. The results are shown below in Table 1.

TABLE 1

| Sensor Location | Process Temperature (° C.) | E (volts) | O$_2$ Partial Pressure |
|---|---|---|---|
| Gas Inlet | Room Temp. | 0.192 | 3.46 × 10$^{-5}$ |
| Gas Inlet | Room Temp. | 0.177 | 6.83 × 10$^{-5}$ |
| Gas Outlet | 725 | 1.248 | 5.36 × 10$^{-26}$ |
| Gas Outlet | 1037 | 1.273 | 1.72 × 10$^{-26}$ |
| Gas Outlet | 1600, 1 hr. | 0.962 | 2.32 × 10$^{-20}$ |
| Gas Outlet | 1600, 2 hrs. | 0.936 | 7.54 × 10$^{-20}$ |
| Gas Outlet | 1600, 3 hrs. | 0.928 | 1.08 × 10$^{-19}$ |
| Gas Outlet | Room Temp. | 0.185 | 4.75 × 10$^{-5}$ |

EXAMPLE 5

Ti, SiC and graphite powders are mixed to yield the Ti$_3$SiC$_2$ stoichiometry. The mixture is placed in a tube furnace under a 2.5 l/min flow of a mixture of hydrogen and H$_2$O. The gas mixture has an hydrogen partial pressure of 0.9999 atm with the balance being H$_2$O. The flow of gas is continuous throughout the preparation. The furnace is heated at a rate of 8° C./min to approximately 1527° C. and held (soaked) there for 4 hrs. After the 4 hours, the furnace and gas flow are turned off. The powder bed is taken out of the furnace.

At 1527° C. (1800° K.) the reaction H$_2$+½O$_2$→H$_2$O has a free energy value of approximately −147000 J/mol. Thus, at equilibrium the mass action expression is as follows:

$$\frac{P_{H2O}}{P_{H2}P_{O2}^{1/2}} = \exp - \frac{-147{,}111}{8.314 \times 1800} = 9.82$$

which can be rearranged to yield:

$$P_{O2} = \left(0.1 \frac{P_{H2O}}{P_{H2}}\right)^2$$

Thus, the oxygen partial pressure is a function of the $P_{H2O}/P_{H2}$ ratio. Using a buffered gas mixture having a hydrogen partial pressure of 0.9999 atm and an H$_2$O partial pressure of 0.0001 atm yields an oxygen partial pressure of 1×10$^{-10}$ atm.

EXAMPLE 6

A reaction according to Example 4 is conducted except that a mixture of hydrogen and H$_2$O having a hydrogen partial pressure of 0.99999 and an H$_2$O partial pressure of 0.00001 is used. The resulting oxygen partial pressure is 1×10$^{-12}$ atm.

EXAMPLE 7

A reaction according to Example 4 is conducted except that a mixture of hydrogen and H$_2$O having a hydrogen partial pressure of 0.999999 and an H$_2$O partial pressure of 0.000001 is used. The resulting oxygen partial pressure is 1×10$^{-14}$ atm.

EXAMPLE 8

A substantially single-phase Ti$_3$SiC$_2$ powder was prepared in accordance with Example 1. The powder was sifted to produce a -325 mesh powder with a $d_m \approx 8$ μm. The resulting powder was cold pressed to form discs with $\approx 1$" diameters. These discs were then placed in a tube furnace with an argon gas flow of $\approx 0.5$ l/min entering through a single inlet and exiting through a single outlet. An oxygen getter in the form of a titanium powder bed 1" wide, 0.5" thick and 5" long was placed inside the tube furnace at the gas inlet and in front of the discs.

The tube furnace was turned on and the temperature was allowed to rise at a rate of $\approx 10°$ C./min to 1600° C., and then held at that temperature for approximately 4 hours. The furnace was then turned off. The sintered discs were then cut, mounted and polished down to 1 μm. The polished pieces were then etched using a 1:1:1 volume ratio solution of HF, $HNO_3$ and $H_2O$.

The etched samples were then evaluated using an optical microscope and found to contain <2% $TiC_x$.

EXAMPLE 9

A substantially single-phase $Ti_3SiC_2$ powder was prepared in accordance with Example 1. The powder was sifted to produce a -325 mesh powder with a $d_m \approx 8$ μm. The resulting powder was mixed with hydroxyethylcellulose as a binder and extruded into rods. These rods were then placed in a tube furnace with a hydrogen gas flow of $\approx 0.5$ l/min entering through a single inlet and exiting through a single outlet. An oxygen getter in the form of a titanium powder bed 1" wide, 0.5" thick and 5" long was placed inside the tube furnace at the gas inlet and in front of the rods.

The tube furnace was turned on and the temperature was allowed to rise at a rate of $\approx 2°$ C./min to $\approx 500°$ C. in order to remove the binder, and then at a rate of $\approx 5°$ C./min to 1600° C., and held at that temperature for approximately 4 hours. The furnace was then turned off. The sintered rods were then cut, mounted and polished down to 1 μm. The polished pieces were then etched using a 1:1:1 volume ratio solution of HF, $HNO_3$ and $H_2O$.

The finished rods were then evaluated using an optical microscope and found to contain <2% $TiC_x$.

COMPARATIVE EXAMPLE 1

A substantially single-phase $Ti_3SiC_2$ powder was prepared in accordance with Example 1. The powder was sifted to produce a -325 mesh powder with a $d_m \approx 8$ μm. The resulting powder was cold pressed to form discs with $\approx 1$" diameters. These discs were then placed in a tube furnace with an argon gas flow of $\approx 0.5$ l/min entering through a single inlet and exiting through a single outlet. No oxygen getter was placed inside of the tube furnace.

The tube furnace was turned on and the temperature was allowed to rise at a rate of $\approx 10°$ C./min to $\approx 1600°$ C., and then held at that temperature for approximately 4 hours. The furnace was then turned off. The sintered discs were then cut, mounted and polished down to 1 μm. The polished pieces were then etched using a 1:1:1 volume ratio solution of HF, $HNO_3$ and $H_2O$.

The etched samples were then evaluated using an optical microscope and found to contain $\approx 5$-10% $TiC_x$.

COMPARATIVE EXAMPLE 2

A substantially single-phase $Ti_3SiC_2$ powder was prepared in accordance with Example 1. The powder was sifted to produce a -325 mesh powder with a $d_m \approx 8$ μm. The resulting powder was mixed with hydroxyethylcellulose as a binder and extruded into rods. These rods were then placed in a tube furnace with a hydrogen gas flow of $\approx 0.5$ l/min entering through a single inlet and exiting through a single outlet. No oxygen getter was placed inside of the tube furnace.

The tube furnace was turned on and the temperature was allowed to rise at a rate of $\approx 8°$ C./min to z 1600° C., and held at that temperature for approximately 4 hours. The furnace was then turned off. The sintered rods were then cut, mounted and polished down to 1 μm. The polished pieces were then etched using a 1:1:1 volume ratio solution of HF, $HNO_3$ and $H_2O$.

The finished rods were then evaluated using an optical microscope and found to contain $\approx 10$-20% $TiC_x$.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for forming a material comprising an $M_3X_1Z_2$ phase wherein M is at least one transition metal, X is at least one of Al, Ge and Si, and Z is at least one of B, C and N, said process comprising the steps of:

(a) providing a mixture of (i) at least one transition metal species, (ii) at least one co-metal species selected from the group consisting of aluminum species, germanium species and silicon species, and (iii) at least one non-metal species selected from the group consisting of boron species, carbon species and nitrogen species;

(b) heating said mixture to a temperature of about 1000° C. to about 1800° C., in an atmosphere within a substantially enclosed heating zone, for a time sufficient to form said $M_3X_1Z_2$ phase; wherein the atmosphere has an $O_2$ partial pressure of no greater than about $1 \times 10^{-6}$ atm.

2. The process according to claim 1, wherein step (b) is performed at substantially atmospheric pressure.

3. The process according to claim 1, wherein step (b) is performed under an applied vacuum, and wherein the atmosphere has an $O_2$ partial pressure of no greater than about $1 \times 10^{-8}$ atm.

4. The process according to claim 1, wherein said at least one transition metal species is selected from the group consisting of titanium powder, titanium hydride and titanium carbide.

5. The process according to claim 1, wherein said at least one co-metal species comprises silicon powder.

6. The process according to claim 1, wherein said at least one co-metal species is selected from the group consisting of silicon powder and silicon carbide.

7. The process according to claim 1, wherein said $M_3X_1Z_2$ phase comprises $Ti_3SiC_2$.

8. The process according to claim 1, wherein said mixture is heated to a temperature of about 1100° C. to about 1650° C.

9. The process according to claim 1, wherein said mixture is heated to a temperature of about 1300° C. to about 1550° C.

10. The process according to claim 1, wherein the atmosphere has an $O_2$ partial pressure of no greater than about $1 \times 10^{-12}$ atm.

11. The process according to claim 1, wherein the atmosphere has an $O_2$ partial pressure of no greater than about $1 \times 10^{-20}$ atm.

12. The process according to claim 1, wherein the atmosphere has an $O_2$ partial pressure of no greater than about $1 \times 10^{-25}$ atm.

13. The process according to claim 1, wherein the maximum temperature of said heating step is attained at a heating rate no greater than 25° C./min.

14. The process according to claim 1, wherein the maximum temperature of said heating step is attained at a heating rate of from about 2° C./min to about 15° C./min.

15. The process according to claim 1, wherein the maximum temperature of said heating step is attained at a heating rate of from about 3° C./min to about 10° C./min.

16. The process according to claim 1, wherein step (b) comprises feeding a buffered gas mixture into said heating zone via a gas inlet to reduce the $O_2$ partial pressure of the atmosphere within the heating zone.

17. The process according to claim 16, wherein said buffered gas mixture comprises $H_2$ and $H_2O$.

18. The process according to claim 1, wherein step (b) comprises contacting said atmosphere with an oxygen getter prior to contact with said mixture to reduce the $O_2$ partial pressure of the atmosphere within the heating zone.

19. The process according to claim 18, wherein said oxygen getter comprises metal powder.

20. The process according to claim 19, wherein said metal powder comprises at least one metal selected from the group consisting of titanium, hafnium, zirconium and iron.

21. The process according to claim 19, wherein said metal powder comprises titanium.

22. The process according to claim 19, wherein said oxygen getter is maintained at an elevated temperature which is lower than the temperature in step (b).

23. A process for forming a dense, substantially single-phase, $M_3X_1Z_2$-phase workpiece, wherein M is at least one transition metal, X is at least one of Al, Ge and Si, and Z is at least one of B, C and N, said process comprising the steps of:

(a) providing a highly-pure $M_3X_1Z_2$-phase powder pre-form;

(b) sintering said pre-form at a temperature of about 1000° C. to about 1800° C., in an atmosphere within a substantially enclosed heating zone, for a time sufficient to form a dense, substantially single-phase, $M_3X_1Z_2$-phase workpiece; wherein the atmosphere has an $O_2$ partial pressure of no greater than about $1 \times 10^{-6}$ atm.

24. A process for forming a dense, substantially single-phase, $M_3X_1Z_2$-phase workpiece, wherein M is at least one transition metal, X is at least one of Al, Ge and Si, and Z is at least one of B, C and N, said process comprising the steps of:

(a) providing a highly-pure $M_3X_1Z_2$-phase powder pre-form, wherein said highly-pure $M_3X_1Z_2$-phase pre-form comprises an $M_3X_1Z_2$-phase powder prepared in accordance with the process of claim 1;

(b) sintering said pre-form at a temperature of about 1000° C. to about 1800° C., in an atmosphere within a substantially enclosed heating zone, for a time sufficient to form a dense, substantially single-phase, $M_3X_1Z_2$-phase workpiece; wherein the atmosphere has an $O_2$ partial pressure of no greater than about $1 \times 10^{-6}$ atm.

25. The process according to claim 24, wherein said highly-pure $M3X_1Z_2$-phase pre-form is cold-pressed into a compact prior to step (b).

26. The process according to claim 24, wherein said highly-pure $M_3X_1Z_2$-phase pre-form further comprises a binder.

* * * * *